United States Patent
Kwok

(10) Patent No.: US 11,793,228 B2
(45) Date of Patent: Oct. 24, 2023

(54) FOOD MOLDING AND STORAGE KITS AND RELATED METHODS

(71) Applicant: Grace Kwok, Toronto (CA)

(72) Inventor: Grace Kwok, Toronto (CA)

(*) Notice: Subject to any disclaimer, the term of this patent is extended or adjusted under 35 U.S.C. 154(b) by 172 days.

(21) Appl. No.: 17/249,327

(22) Filed: Feb. 26, 2021

(65) Prior Publication Data
US 2021/0267256 A1    Sep. 2, 2021

Related U.S. Application Data

(60) Provisional application No. 62/983,973, filed on Mar. 2, 2020.

(51) Int. Cl.
| | | |
|---|---|---|
| A23P 30/10 | (2016.01) | |
| A21C 3/00 | (2006.01) | |
| A23K 40/20 | (2016.01) | |
| A47J 43/20 | (2006.01) | |

(52) U.S. Cl.
CPC ............. *A23P 30/10* (2016.08); *A21C 3/00* (2013.01); *A23K 40/20* (2016.05); *A47J 43/20* (2013.01)

(58) Field of Classification Search
CPC ......... A23K 50/42; A23K 40/20; A23P 30/10; A21C 11/18; A21C 3/00; A47J 43/20; A23N 17/005
See application file for complete search history.

(56) References Cited

U.S. PATENT DOCUMENTS

| | | | | |
|---|---|---|---|---|
| 3,837,775 | A * | 9/1974 | Boucher | A22C 7/0076 |
| | | | | D7/672 |
| 6,054,157 | A | 4/2000 | Shapiro et al. | |
| 7,841,848 | B2 * | 11/2010 | Tatham | A22C 25/22 |
| | | | | 425/188 |
| 2006/0088634 | A1 * | 4/2006 | Shah | A23K 40/25 |
| | | | | 426/518 |
| 2012/0244267 | A1 * | 9/2012 | Smith | A23P 30/10 |
| | | | | 426/392 |
| 2013/0004628 | A1 * | 1/2013 | Williams | G09B 19/0092 |
| | | | | 434/127 |
| 2017/0259951 | A1 * | 9/2017 | Manion | B65D 75/32 |

FOREIGN PATENT DOCUMENTS

CA        1022383 A        12/1977

OTHER PUBLICATIONS

International Search Report and Written Opinion of corresponding International Application No. PCT/CA2021/050250, dated May 12, 2021, 8 pages.

LifetimeBrandsVideo. Chicago Metallic Cookie Dough Shaper. Youtube[online][video]. Sep. 29, 2017. Retrieved from https://www.youtube.com/watch?v=qEyunnMJUbw. Retrieved Jul. 12, 2021.

* cited by examiner

*Primary Examiner* — Dana Ross
*Assistant Examiner* — Kuangyue Chen

(57) ABSTRACT

A kit for molding and storing malleable foodstuff includes (a) a molding tube; (b) a plunger slidable within the molding tube for tamping foodstuff received therein to form a shaped food article corresponding in shape to an interior of the molding tube; and (c) at least one storage tube sized and shaped for storing the shaped food article therein with reduced surface area contact relative to the molding tube.

16 Claims, 15 Drawing Sheets

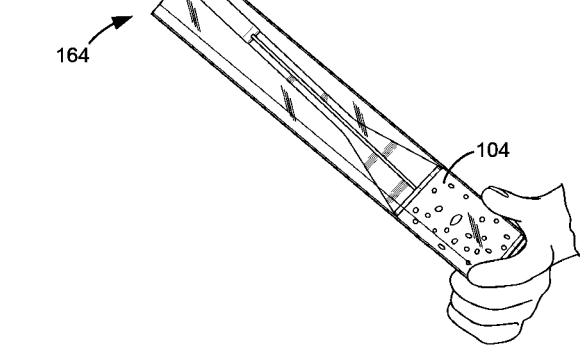
FIG. 5
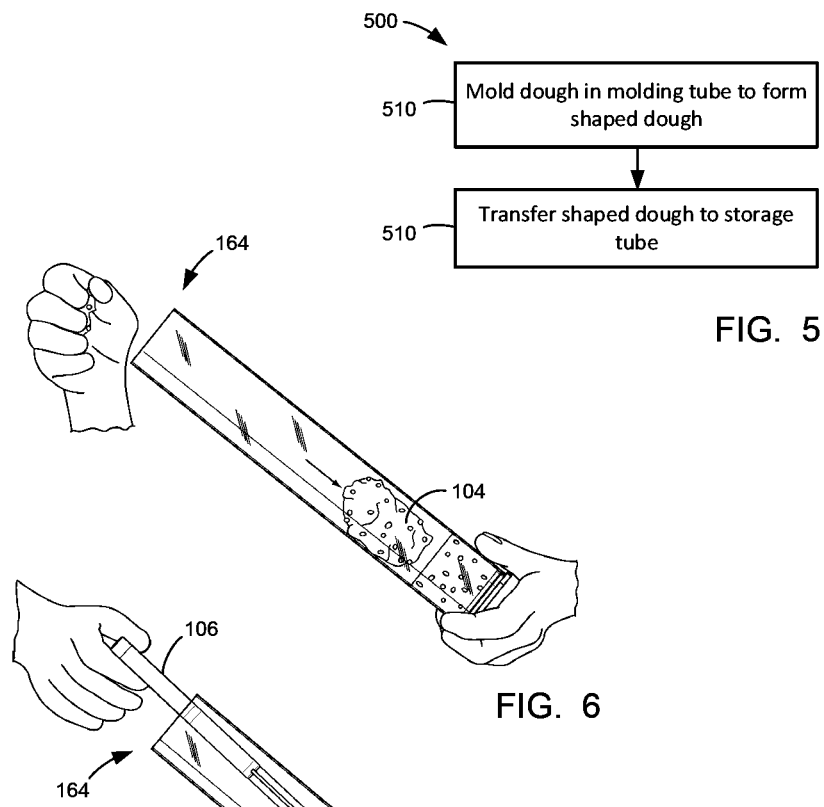
FIG. 6
FIG. 7

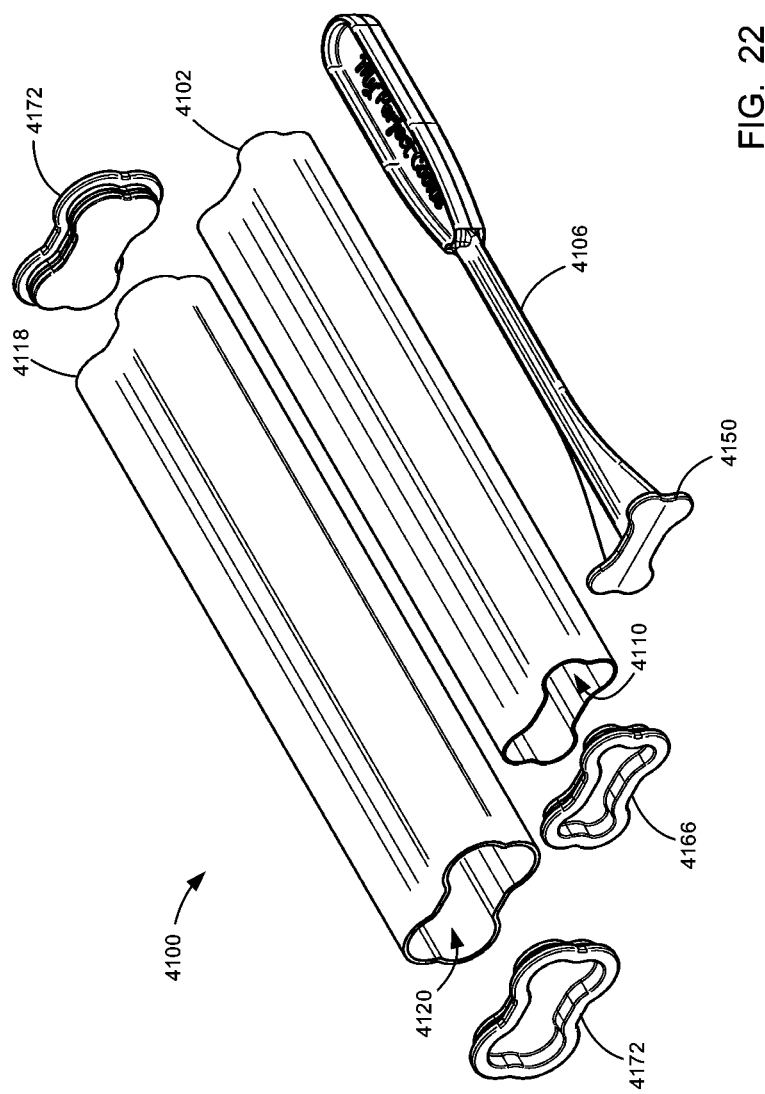

FOOD MOLDING AND STORAGE KITS AND RELATED METHODS

CROSS-REFERENCE TO RELATED APPLICATIONS

This application claims the benefit of U.S. Provisional Application No. 62/983,973 filed Mar. 2, 2020, the entirety of which is hereby incorporated herein by reference.

FIELD

The specification relates generally to food preparation and storage, and more specifically, to food molding and storage kits and related methods.

BACKGROUND

U.S. Pat. No. 6,054,157 (Shapiro et al.) discloses a reusable cookie dough storage container for storing and refrigerating cookie dough. The container includes a generally tubular, hollow member having a self-sustaining shape and a substantially uniform cross-section substantially along its entire length with a piston slidably received in the tubular member and axially movable therein along a longitudinal axis of the tubular member. The tubular member has at least a first end cap releasably received on a longitudinal end of the tubular member, such that the first end cap and the piston form a cookie dough storage chamber within the tubular member when spaced apart. The piston is adapted to substantially seal the storage chamber containing the cookie dough, when used in combination with the first end cap, and to apply a positive pressure on the cookie dough stored within the storage chamber for extruding said cookie dough from the storage chamber when the first end cap is removed.

U.S. Pat. No. 7,841,848 (Tatham) discloses an apparatus for preparing a rolled food product, such as sushi. The apparatus has a container having a first end and a second end, wherein at least the first end has one aperture. The container is positionable between a closed position, defining a hollow interior space, and an open position, presenting a plurality of cavities. Each of the cavities can receive food material such as rice. There is also a plunger assembly that passes the aperture when the container is in the closed position. The plunger assembly is then used to compress the food material in the hollow interior space to form a roll having a desired consistency.

SUMMARY

The following summary is intended to introduce the reader to various aspects of the applicant's teaching, but not to define any invention.

According to some aspects, a method of molding and storing malleable foodstuff includes: (a) molding the foodstuff in a molding tube to form a shaped food article corresponding in shape to an interior of the molding tube; and (b) transferring the shaped food article from the molding tube into a storage tube sized and shaped for storage of the shaped food article therein with most of a radially outer surface of the shaped food article spaced apart from a radially inner surface of the storage tube.

In some examples, step (a) includes (i) tamping the foodstuff with a plunger.

In some examples, step (a) further includes, after (i), (ii) removing the plunger from the molding tube, (iii) adding more foodstuff into the molding tube, and (iv) repeating (i).

In some examples, step (a) further includes repeating (ii) to (iv) until the molding tube is generally filled with the foodstuff.

In some examples, the plunger is hand-held and detached from the molding tube during step (a).

In some examples, step (b) includes pushing the shaped food article out from the molding tube with the plunger.

In some examples, the method further includes, prior to step (a), sealing a first end of the molding tube, and step (a) includes inserting the foodstuff and the plunger through a second end of the molding tube opposite the first end.

In some examples, step (b) includes unsealing the first end of the molding tube and pushing the shaped food article out from the molding tube using the plunger.

In some examples, step (b) includes inserting an open end of the molding tube into the storage tube, and pushing the shaped food article out from the molding tube through the open end and into the storage tube.

In some examples, the method further includes, after step (b), sealing the storage tube.

In some examples, the method further includes, after step (b), repeating steps (a) and (b) for another storage tube.

According to some aspects, a kit for molding and storing malleable foodstuff includes: (a) a molding tube defining a molding interior extending along a molding tube axis. The molding interior has a molding cross-sectional profile. The molding cross-sectional profile is generally constant along the molding tube axis. The kit further includes (b) a plunger slidable within the molding interior along the molding tube axis for tamping malleable foodstuff received in the molding interior to form a shaped food article corresponding in shape to the molding cross-sectional profile; and (c) at least one storage tube defining a storage interior extending along a storage tube axis. The storage interior has a storage cross-sectional profile. The storage cross-sectional profile is generally constant along the storage tube axis. The molding cross-sectional profile is nestable within a perimeter of the storage cross-sectional profile to facilitate storage of the shaped food article in the storage interior with reduced surface area contact relative to the molding interior.

In some examples, the molding tube is insertable into the storage tube.

In some examples, the molding cross-sectional profile is defined by a molding tube inner diameter and the storage cross-sectional profile is defined by a storage tube inner diameter. The storage tube inner diameter is greater than the molding tube inner diameter.

In some example, the storage tube inner diameter is at least ¼ inch greater than the molding tube inner diameter.

In some examples, the molding tube has a molding tube outer diameter, and the storage tube inner diameter is greater than the molding tube outer diameter.

In some examples, the molding tube extends longitudinally between a molding tube first end and a molding tube second end opposite the molding tube first end, and the molding interior is open to the molding tube first and second ends. The kit further includes a molding tube closure for sealing the molding tube first end to facilitate tamping of the foodstuff from the molding tube second end using the plunger.

In some examples, the molding tube closure is removable for unsealing the molding tube first end to facilitate pushing the shaped food article out from the molding interior using the plunger.

In some examples, the kit includes a single molding tube closure for each molding tube.

In some examples, the kit further includes one or more storage tube closures for sealing the storage tube when the shaped food article is received therein.

In some examples, the storage tube extends longitudinally between a storage tube first end and a storage tube second end opposite the storage tube first end. The storage interior is open to the storage tube first and second ends. The storage tube closures include a storage tube first closure for sealing the storage tube first end and a storage tube second closure for sealing the storage tube second end.

In some examples, the molding tube is resiliently deformable in a transverse direction to permit a user to externally manipulate the foodstuff in the molding interior.

In some examples, the storage tube is generally rigid.

In some examples, the molding tube is defined by a molding tube wall thickness and the storage tube is defined by a storage tube wall thickness. The storage tube wall thickness is greater than the molding tube wall thickness.

In some examples, the plunger is hand-held and detached from the molding tube.

In some examples, the plunger extends along a plunger axis between a front end and a rear end, and includes a piston at the front end for pressing against the foodstuff and a handle at the rear end for gripping by a user.

In some examples, the piston is sized and shaped for close sliding fit within the molding interior.

In some examples, the molding tube is split longitudinally into a molding tube first portion and a molding tube second portion. The molding tube first and second portions are movable relative to each other between a closed position in which the molding tube first and second portions cooperate to define the molding interior, and an open position in which the molding tube first and second portions are at least partially separated to facilitate insertion and removal of the foodstuff from the molding tube.

In some examples, the kit further includes at least one removable molding tube collar sized for close fit over the molding tube when in the closed position for inhibiting separation of the first and second portions.

In some examples, the storage tube is split longitudinally into a storage tube first portion and a storage tube second portion. The storage tube first and second portions are movable relative to each other between a closed position in which the storage tube first and second portions cooperate to define the storage interior, and an open position in which the storage tube first and second portions are at least partially separated to facilitate insertion of the shaped food article into and removal of the shaped food article out from the storage tube.

In some examples, the storage tube includes a plurality of cutting indicators spaced generally equally apart at predetermined intervals along the storage tube axis, the intervals corresponding to a predetermined thickness at which to cut the shaped food article.

In some examples, each indicator comprises one or more projections extending radially inwardly from an inner surface of the storage tube for forming one or more corresponding indentations in the shaped food article when stored in the storage interior.

In some examples, the molding cross-sectional profile is one of circle-shaped, square-shaped, heart-shaped, oval-shaped, and dog bone shaped.

In some examples, the storage cross-sectional profile is one of circle-shaped, square-shaped, heart-shaped, oval-shaped, and dog bone shaped.

In some examples, the kit can include one or more ingredients for preparing the malleable foodstuff. The one or more ingredients can comprise shelf stable packaged ingredients for preparing the foodstuff. In some examples, the foodstuff comprises dough, and the one or more ingredients comprise shelf stable ingredients for preparing the dough. In some examples, the dough comprises cookie dough. In some examples, the foodstuff comprises a pet food mix (e.g. a dog treat mix for baking dog treats), and the one or more ingredients comprise shelf stable packaged ingredients for preparing the pet food mix.

According to some aspects, a kit for molding and storing malleable foodstuff includes: (a) molding tube having a molding tube interior defined by a mold cross-sectional shape and mold cross-sectional dimensions; (b) a plunger slidable within the molding tube interior for tamping the foodstuff in the molding tube interior to form a shaped food article having the mold cross-sectional shape and dimensions; and (c) at least one storage tube having a storage tube interior defined by a storage cross-sectional shape and storage cross-sectional dimensions, the storage cross-sectional shape corresponding to the mold cross-sectional shape, and the storage cross-sectional dimensions greater than corresponding mold cross-sectional dimensions to facilitate storage of the shaped food article in the storage tube interior with reduced surface area contact relative to the molding tube interior.

In some examples, the plunger includes a piston sized and shaped for close sliding fit within the molding tube interior.

In some examples, the kit further includes a molding tube closure for sealing one end of the molding tube interior to facilitate tamping of the foodstuff from an opposite end of the molding tube interior using the plunger.

In some examples, the kit further includes a pair of storage tube closures for sealing opposing ends of the storage tube interior when the shaped food article is received therein.

A kit for molding and storing malleable foodstuff includes: (a) a molding tube for shaping food product received therein; (b) a plunger slidable within the molding tube for tamping the food product in the molding tube to form a shaped food product corresponding in shape to an interior of the molding tube; and (c) at least one storage tube sized and shaped for storing the shaped food product therein with reduced surface area contact relative to the molding tube.

In some examples, the kit includes instructions for using the kit according to one or more of the method steps disclosed herein.

BRIEF DESCRIPTION OF THE DRAWINGS

The drawings included herewith are for illustrating various examples of apparatuses, kits, and methods of the present specification and are not intended to limit the scope of what is taught in any way. In the drawings:

FIG. 5 is a flow chart showing an example process for molding and storing malleable foodstuff;

FIGS. 6 to 13 are views of the kit of FIG. 1 in use according to steps of the process of FIG. 5;

FIG. 22 is an exploded perspective view of the kit of FIG. 21.

DETAILED DESCRIPTION

Figure 1:
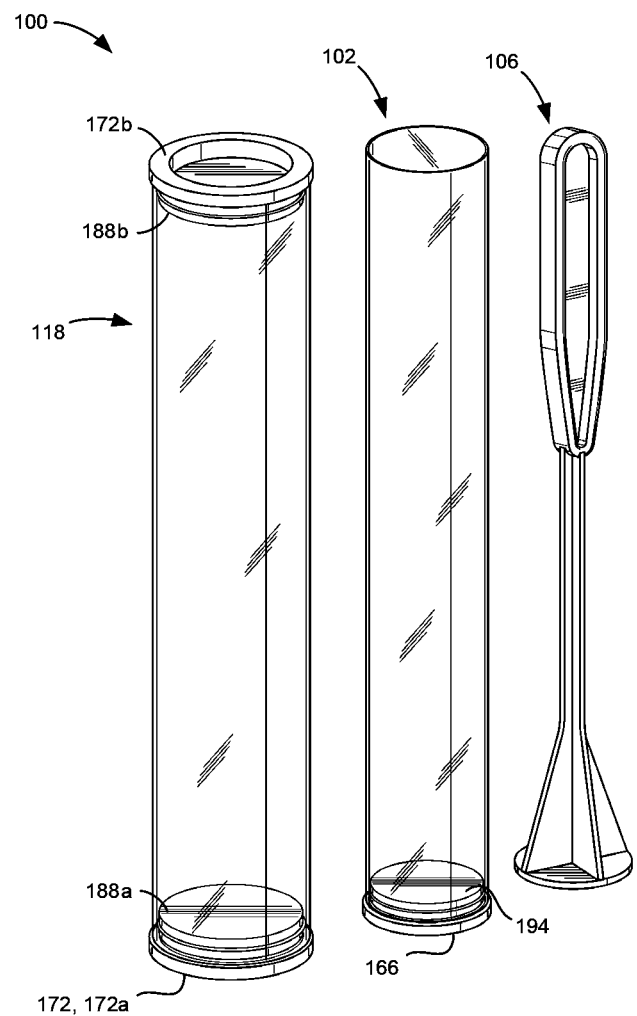
FIG. 1 is a perspective view of an example food molding and storage kit, shown assembled.

Various apparatuses, kits, or processes will be described below to provide an example of an embodiment of each claimed invention. No embodiment described below limits any claimed invention and any claimed invention may cover apparatuses, kits, or processes that differ from those described below. The claimed inventions are not limited to apparatuses, kits, or processes having all of the features of any one apparatus, kit, or process described below or to features common to multiple or all of the apparatuses, kits, or processes described below. It is possible that an apparatus, kit, or process described below is not an embodiment of any claimed invention. Any invention disclosed in an apparatus, kit, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

During food preparation, it may be desirable to shape certain types of food prior to cooking. Some types of food, including certain types of malleable foodstuff such as dough (e.g. cookie dough), are well suited for shaping well before being cooked (e.g. baked). It can be beneficial to mold such foodstuff in bulk to form one or more shaped food articles, and store the shaped food articles (e.g. in a refrigerator or freezer) until required for cooking. This can improve the overall efficiency and workflow of the food preparation process, particularly in busy commercial kitchen environments.

The present application discloses aspects relating to food molding and storage kits for molding malleable foodstuff, such as dough, to form one or more shaped food articles having a desired cross-sectional profile, and storing the shaped food articles until required for subsequent processing (e.g. cutting into individual portions and/or cooking). The kit includes a molding container (in the form of a molding tube in the examples disclosed herein) defining an interior for receiving foodstuff, such as dough, and for molding the received foodstuff to form a shaped food article having a cross-sectional profile corresponding to that of the interior of the molding container. A plunger can be provided as part of the kit for tamping the foodstuff in the interior of the molding tube to help form the shaped food article. Once formed in the molding tube, the shaped food article can be transferred from the molding tube to an interior of a reusable storage container (in the form of a storage tube in the examples disclosed herein) having a cross-sectional profile larger than that of the shaped food article (and interior of the molding tube). This can facilitate storage of the shaped food article in the storage tube with reduced surface area contact (relative to when the shaped food article is formed in the molding tube), which can help provide for easier transfer of the shaped food article into and out from the storage tube and reduce deformation of the shaped food article during storage and transfer by, for example, reducing surface area that may engage and/or freeze to the inner surface of the storage tube. The kit can be provided with multiple reusable storage tubes, so that multiple shaped food articles can be formed using the molding tube and transferred to respective storage tubes for storage. Each storage tube can be sealed generally air tight and placed in, for example, a refrigerator or freezer for storage of the shaped food article until required for subsequent processing.

Referring to FIG. 1, an example kit 100 for molding and storing malleable foodstuff is illustrated. In the example illustrated, the kit 100 includes a molding tube 102 for receiving and molding foodstuff, which is in the form of dough in the present example (see e.g. cookie dough 104 shown in FIG. 6). In some examples, the kit 100 can include one or more ingredients for preparing the foodstuff (e.g. the cookie dough 104). The ingredients can be shelf stable and prepackaged with the kit 100.

Figure 8:
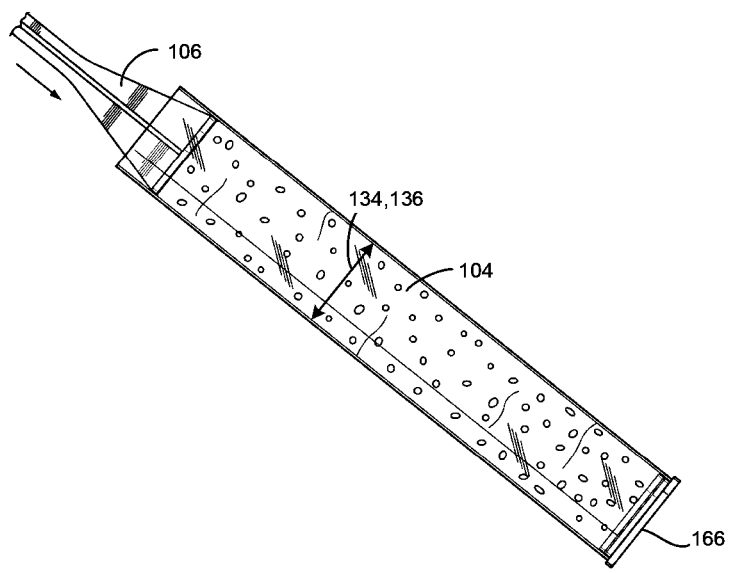

In the example illustrated, the kit 100 further includes a plunger 106 slidable within the molding tube 102 for tamping the foodstuff (e.g. dough) received in the molding tube 102 to form a shaped food article 108 (also referred to as shaped dough article; see e.g. FIG. 8).

Figure 2:
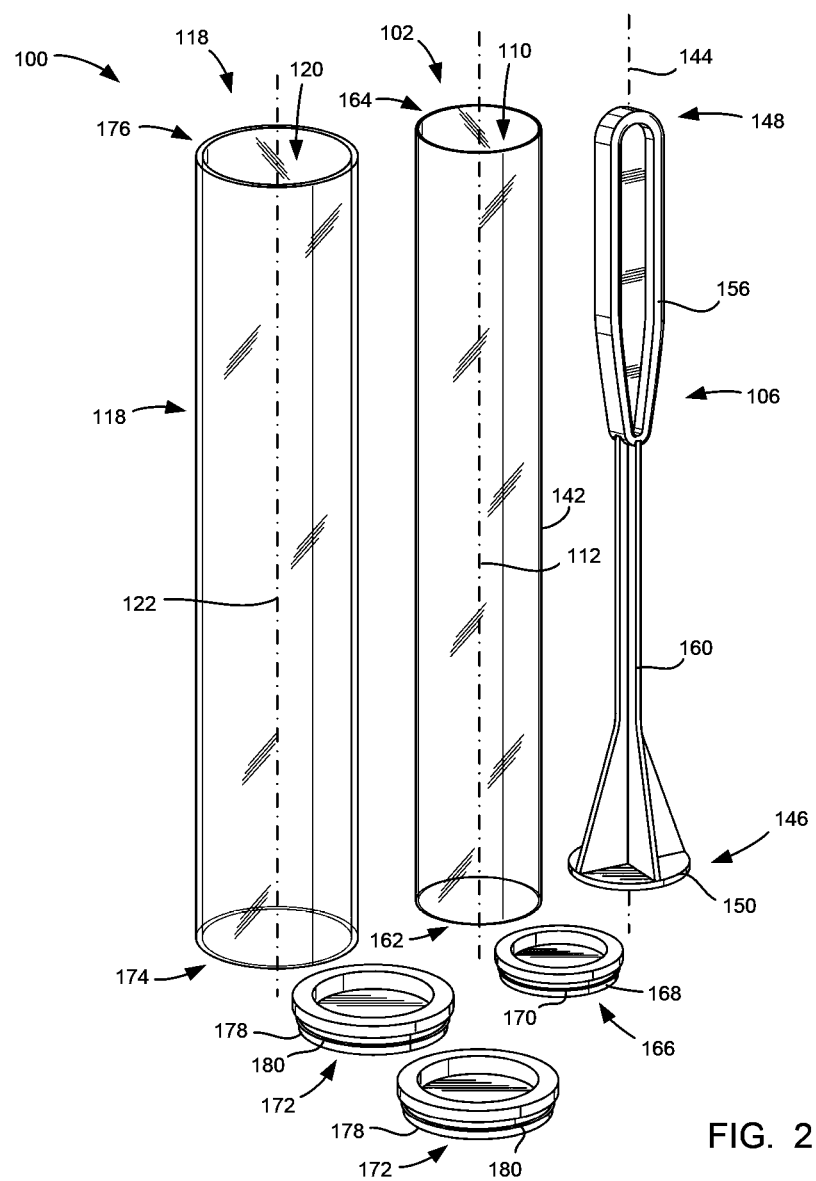
FIG. 2 is a perspective view of the kit of FIG. 1, shown disassembled.
Figure 3:
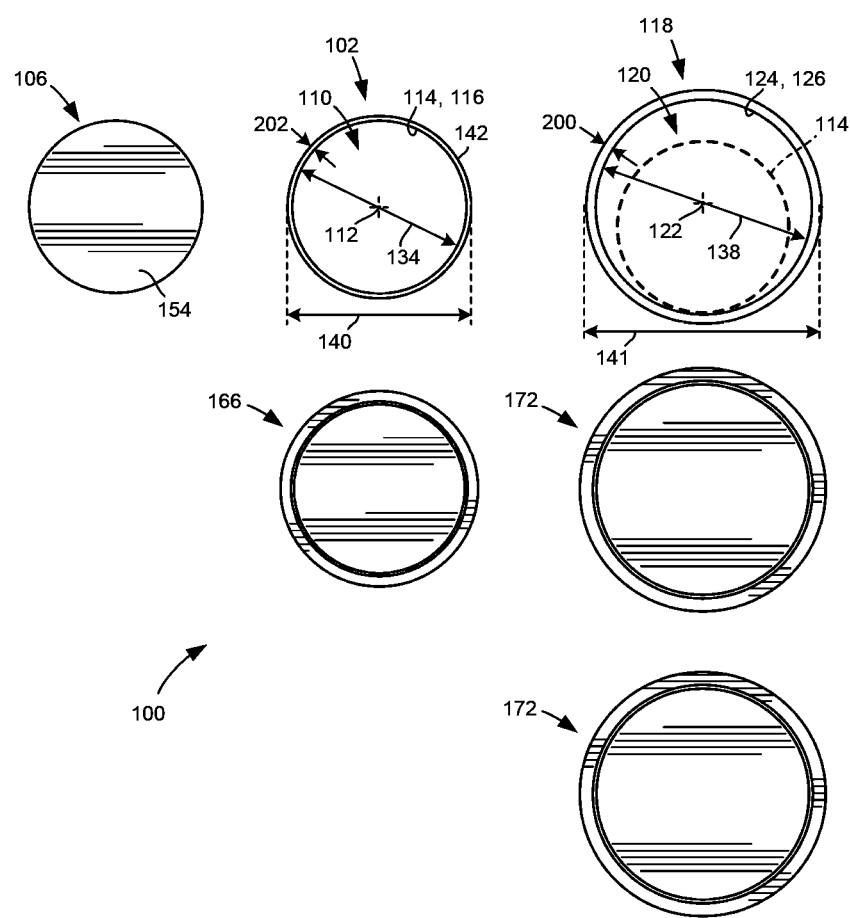
FIG. 3 is a bottom view of the kit of FIG. 2.

Referring to FIG. 2, in the example illustrated, the molding tube 102 defines a molding bore 110 (also referred to as molding interior) extending along a molding bore axis 112 (also referred to as molding tube axis) for receiving the dough. Referring to FIG. 3, the molding bore 110 has a molding cross-sectional profile 114 (normal to the bore axis 112) defined by an inner surface 116 of the molding tube 102. In the example illustrated, the molding cross-sectional profile 114 is defined by a mold cross-sectional shape and mold-cross-sectional dimensions. In the example illustrated, the molding cross-sectional profile 114 defines the cross-sectional shape of the shaped dough article 108 when formed in the molding tube 102. In the example illustrated, the molding cross-sectional profile 114 is generally constant along the molding bore axis 112.

Figure 13:
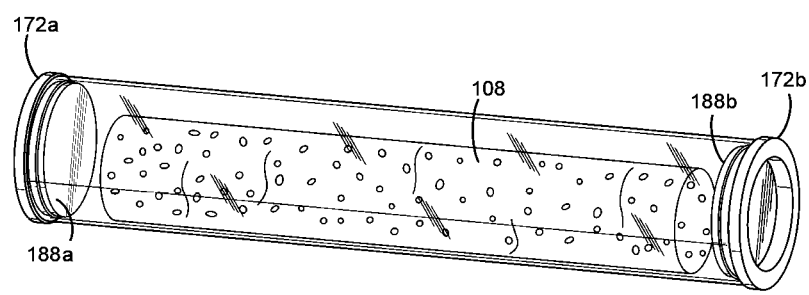

Referring to FIG. 2, in the example illustrated, the kit 100 further includes at least one storage tube 118 sized and shaped for storing the shaped dough article 108 formed in the molding tube 102 (see also FIG. 13). In the example illustrated, the storage tube 118 defines a storage bore 120 (also referred to as storage interior) extending along a storage bore axis 122 (also referred to as a storage tube axis). Referring to FIG. 3, the storage bore 120 has a storage cross-sectional profile 124 (normal to the bore axis 122) defined by an inner surface 126 of the storage tube 118. The storage cross-sectional profile 124 defines the cross-sectional area available for storing the shaped dough article 108 in the storage bore 120. In the example illustrated, the storage cross-sectional profile 124 is defined by a storage cross-sectional shape and storage cross-sectional dimensions. In the example illustrated, the storage cross-sectional profile 124 is generally constant along the storage bore axis 122.

In the example illustrated, the storage cross-sectional profile 124 is sized and shaped relative to the molding cross-sectional profile 114 (and the cross-sectional shape of the shaped dough article) for storing the shaped dough article 108 with reduced surface area contact relative to when the shaped dough article 108 is formed in the molding bore 110. In the example illustrated, the molding cross-sectional profile 114 is sized and shaped to be nestable within a perimeter of the storage cross-sectional profile 124, so that the shaped dough article 108 formed in the molding tube 102 is storable in the storage bore 120 with reduced surface area contact relative to the molding bore 110. For example, when the shaped dough article 108 is formed in the molding bore 110 (i.e. after packing the molding bore 110 with dough 104), most of a radially outer surface 132 of the shaped dough article 108 is in contact with the inner surface 116 of the molding bore 110 (see e.g. FIG. 8), and there is relatively high surface area contact between the shaped dough article 108 and the inner surface 116 of the molding tube 112. When the shaped dough article 108 is transferred from the molding bore 110 to the storage bore 120, most (e.g. more than 50%) of the radially outer surface 132 of the shaped dough article 108 is spaced apart from the inner surface 126 of the storage tube 118, and there is relatively less surface area contact between the shaped dough article 108 and the inner surface 126 of the storage tube 118.

Referring to FIG. 3, in the example illustrated, when nested, at least most of a perimeter of the molding cross-sectional profile 114 is spaced apart from the perimeter of the storage cross-sectional profile 124. Providing a storage cross-sectional profile 124 that is relatively larger than the molding cross-sectional profile 114 (to allow for nesting of the molding cross-sectional profile 114, and in turn, the shaped dough article), can help to, for example, provide for easier transfer of the shaped dough article 108 formed in the molding tube 102 into and out from the storage tube 118 and reduce deformation of the shaped dough article 108 during such transfer by, for example, reducing surface area that may engage and/or freeze to the inner surface 126 of the storage tube 118. In the example illustrated, the storage cross-sectional shape corresponds to the mold cross-sectional shape, and the storage cross-sectional dimensions are greater than corresponding mold cross-sectional dimensions to facilitate storage of the shaped food article in the storage bore 120 with reduced surface area contact relative to the molding bore 110.

In the example illustrated, the molding cross-sectional profile 114 is generally circular and defined by a molding tube inner diameter 134. In the example illustrated, when formed, the shaped dough article 108 is generally cylindrical, and has a diameter 136 generally corresponding to the molding tube inner diameter 134. In the example illustrated, the storage cross-sectional profile 124 is generally circular and defined by a storage tube inner diameter 138. In the example illustrated, the storage tube inner diameter 138 is greater than the molding tube inner diameter 134 (and the diameter 136 of the shaped dough article), to facilitate nestability of the molding cross-sectional profile 114 in the storage cross-sectional profile 124 (and the shaped dough article 108 in the storage bore 120). In some examples, the storage tube inner diameter 138 is at least ¼ inch greater than the molding tube inner diameter 134. In some examples, the molding tube inner diameter 134 can be about 1¾ inches, and the storage tube inner diameter 138 can be about 2 inches As described in more detail below with respect to FIGS. 19 and 20, one or both of the molding cross-sectional profile 114 (and more generally, the molding tube cross-section) and the storage cross-sectional profile 124 (and more generally, the storage tube cross-section) may have a different shape in other examples (e.g. an oval shape, square shape, hexagonal shape, heart shape, and/or any other suitable shape for the purposes disclosed herein).

Figure 4:
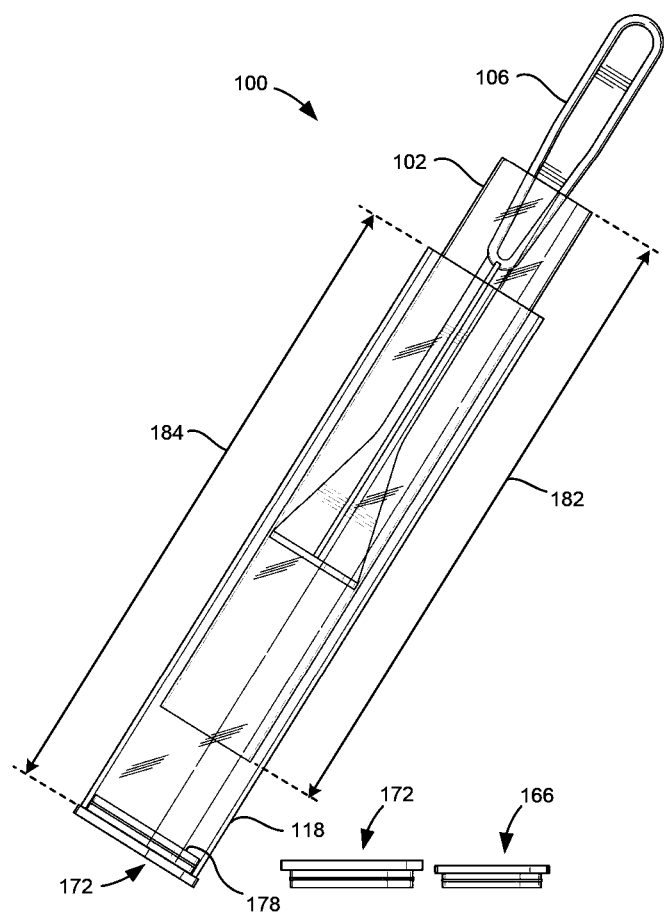
FIG. 4 is a side view of the kit of FIG. 2, showing tube and plunger components of the kit partially nested.

Referring to FIG. 4, in the example illustrated, the molding tube 102 is sized and shaped to be insertable into the storage tube 118. This can facilitate transfer of the shaped dough article 108 from the molding tube 102 into the storage tube 118 (see e.g. FIG. 11). Referring to FIG. 3, in the example illustrated, the molding tube 102 has a molding tube outer diameter 140. In the example illustrated, the storage tube inner diameter 138 is greater than the molding tube outer diameter 140 to allow for insertion (and nesting) of the molding tube 102 in the storage bore 120. In the example illustrated, when the molding tube 102 is inserted into the storage bore 120, an outer surface 142 of the molding tube 102 is spaced apart from the inner surface 126 defining the storage bore 120.

Referring to FIG. 2, in the example illustrated, the plunger 106 extends along a plunger axis 144 between a front end 146 and a rear end 148. The plunger 106 has a piston 150 at the front end 146 for pressing against (and tamping) the dough 104 received in the molding bore 110. In the example illustrated, the piston 150 is sized and shaped for close sliding fit within the molding bore 110, and has a piston cross-sectional shape corresponding generally to the molding cross-sectional profile 114. The cross-sectional shape 152 of the piston 150 is generally circular in the example illustrated. In the example illustrated, the piston 150 includes a generally flat piston face 154 at the front end of the plunger 106. In the example illustrated, the plunger includes a handle 156 at the rear end 148 for gripping by a user. In the example illustrated, the handle 156 is connected to the piston 150 through a shaft portion 160 extending therebetween. In the example illustrated, the plunger 106 is hand-held and detached from the molding tube 102 during use. In the example illustrated, the handle 156 is sized to be insertable into the molding bore 110 (see e.g. FIG. 4).

Referring to FIG. 2, in the example illustrated, the molding tube 102 extends longitudinally between a molding tube first end 162 and a molding tube second end 164 opposite the molding tube first end 162. In the example illustrated, the molding bore 110 is open to the molding tube first and second ends 162, 164. In the example illustrated, the kit 100 further includes a molding tube closure 166 for sealing the molding tube first end 162. Sealing the first end 162 with the molding tube closure 166 can facilitate, for example, tamping of the dough 104 from the molding tube second end 164 using the plunger 106 (see e.g. FIG. 7). In the example illustrated, the molding tube closure 166 is removable for unsealing the molding tube first end 162 (e.g. after tamping and formation of the shaped dough article 108) to facilitate pushing the shaped dough article 108 out from the molding bore 110 (e.g. through one of the first or second ends 162, 164) using the plunger 106. In the example illustrated, the kit 100 includes a single molding tube closure 166 for the molding tube. In the example illustrated, the molding tube closure 166 comprises a molding tube plug 168 sized for a press fit within the molding bore 110. The molding tube plug 168 includes an annular rib 170 for engagement with the inner surface 116 of the molding bore 110 to facilitate a secure fit.

In the example illustrated, the kit further includes one or more storage tube closures 172 for sealing the storage tube 118 generally air tight when the shaped dough article 108 is received therein. In the example illustrated, the storage tube 118 extends longitudinally between a storage tube first end 174 and a storage tube second end 176 opposite the storage tube first end 174. In the example illustrated, the storage bore 120 is open to the storage tube first and second ends 174, 176. Referring to FIG. 1, in the example illustrated, the kit 100 includes a storage tube first closure 172a for sealing the storage tube first end 174, and a storage tube second closure 172b for sealing the storage tube second end 176. In the example illustrated, the storage tube closures 172a, 172b are removable for unsealing the storage tube first and second ends 174, 176, and to facilitate insertion and removal of the shaped dough article 108 from the storage bore 120. In the example illustrated, each storage tube closure 172 comprises a storage tube plug 178 sized for a press fit within the storage bore 120. Referring to FIG. 2, each storage tube plug 178 includes an annular rib 180 for engagement with the inner surface of the storage bore 120 to facilitate a secure fit.

In some examples, the molding tube, molding closure, and/or plunger can be sized for storage within the sealed storage tube (e.g. when not in use). Referring to FIG. 4, in the example illustrated, the molding tube 102 is generally elongate and has a molding tube length 182 between opposed ends 162, 164 (FIG. 2). In the example illustrated, the storage tube 118 is generally elongate and has a storage tube length 184 between opposed ends 174, 176 (FIG. 2). In the example illustrated, the storage tube length 184 is greater than the molding tube length 182, which can allow for storage of the molding tube 102 in the storage tube 118. In the example illustrated, the molding tube length 182 can be at least four times greater than the molding tube inner diameter 134, and the storage tube length 184 is at least four times greater than the storage tube inner diameter 138.

Referring to FIG. 1, in the example illustrated, when the storage tube first and second ends 174, 176 are sealed, the storage bore 120 has an effective storage length between axially opposed inner surfaces 188a, 188b of the storage tube first and second closures 172a, 172b. In the example illustrated, in which the storage closures comprise plugs, the effective storage length is less than the storage tube length 184. In the example illustrated, when the molding tube first end 162 is sealed, the molding bore 110 has an effective molding length between an inner surface 194 of the molding tube closure 166 and the molding tube second end 164 (FIG. 2). In the example illustrated, the effective molding length is less than the effective storage length of the storage bore 120, so that a length of the shaped dough article 108 formed in the molding tube 102 is less than the effective storage length and can fit axially within the sealed storage tube 118 (e.g. without deforming when the storage tube is sealed with the plugs 178).

In some examples, the effective storage length of the storage bore can be greater than an axial extent of a combination of the molding tube 102 and the molding tube closure 166 when sealing the molding tube first end 162, so that the molding tube 102 and the molding tube closure 166 (when sealing the molding tube first end 162) can fit axially within the sealed storage tube 118. In some examples, the effective storage length can be greater than an axial extent of a combination of the molding tube 102, the molding tube closure 166 when sealing the molding tube first end 162, and the plunger 106 when inserted fully into the molding tube 102, so that the molding tube 102, molding tube closure 166, and plunger 106 can fit axially within the sealed storage tube 118.

In some examples, the storage tube length 184 can be between about ½ to 1 inches greater than the molding tube length 182 to accommodate storage of, for example, the shaped food article, and/or the molding tube and molding tube closure (when mounted on the molding tube) in the sealed storage tube. In some examples, the molding tube length 182 can be between about, for example, 10 and 12 inches, and the storage tube length 184 can be between about, for example, 10½ and 13 inches. In some examples, the storage tube length can be about 11¾ inches, the molding tube length 182 can be about 11 inches, and the plunger length can be about 10¾ inches.

In the example illustrated, each closure 166, 172 has a plug portion insertable into a respective tube (in a press fit) and a rim portion opposite the plug portion for resting on an end face of the tube. In some examples, the plug portion of each closure can have a height (measured in the axial direction) of about ¼ inch and the rim portion can have a height of about ⅛ inch, providing each closure with a total height of about ⅜ inch.

In some examples, the molding tube 102 can be resiliently deformable in a transverse direction. This may allow a user to externally manipulate dough 104 in the molding bore 110, which can help with removing voids and distributing the dough 104 within the molding bore 110 during the tamping process. In some examples, the storage tube 118 can be generally rigid. This may help inhibit deformation and/or damage of the shaped dough article 108 during storage. Referring to FIG. 3, in the example illustrated, the storage tube 118 has a storage tube wall thickness 200 (between the storage tube inner diameter 138 and the storage tube outer diameter 141, in the example illustrated) and the molding tube 102 has a molding tube wall thickness 202 (between the molding tube inner and outer diameters 134, 140, in the example illustrated). In the example illustrated, the molding tube wall thickness 202 is less than the storage tube wall thickness 200. In some examples, the molding tube wall thickness 202 can be about 0.04 inches, and a storage tube wall thickness 200 can be about 0.12 inches.

The molding tube 102, storage tube 118, plunger 106, and closures 166, 172 can be formed of BPA-free, food-grade polymeric materials. The polymeric materials for the molding and storage tubes 102, 118 can comprise a generally transparent plastic material. The polymeric material for the closures 166, 172 can comprise a thermoplastic elastomeric material. The molding tube 102 and the storage tube 118 can be formed through, for example, extrusion, and the plunger 106 and the molding and storage tube closures 166, 172 can be formed through, for example, injection molding.

Referring to FIG. 5, a flow chart illustrating an example process 500 for molding and storing dough is shown, and will be described with respect to the kit 100.

Referring to FIGS. 5-9, at step 510 of the process 500, dough 104 is molded in the molding tube 102 to form the shaped dough article 108. In the example illustrated, step 510 includes tamping the dough 104 with the plunger 106, removing the plunger 106 from the molding tube 102, adding more dough 104 into the molding tube 102 (see e.g. FIG. 6), and further tamping the dough 104. The removing, adding, and tamping steps are repeated until the molding tube 102 is generally filled with packed dough 104 forming the shaped dough article 108 (e.g. as shown in FIG. 8). In some examples, the molding tube 102 has a molding tube length 182 of around 11 inches, and the removing, adding, tamping steps can be repeated to provide the shaped dough article 108 with a length of about 10 inches. In some examples, prior to step 510, the first end 162 of the molding tube 102 is sealed (e.g. via the molding tube closure 166), and the dough 104 and the plunger 106 are inserted into the molding tube 102 through the molding tube second end 164.

Figure 9:
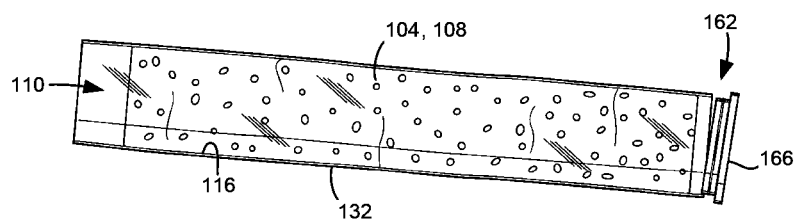
Figure 10:
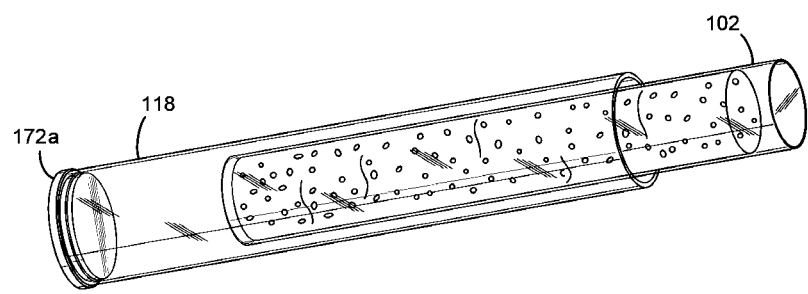
Figure 11:
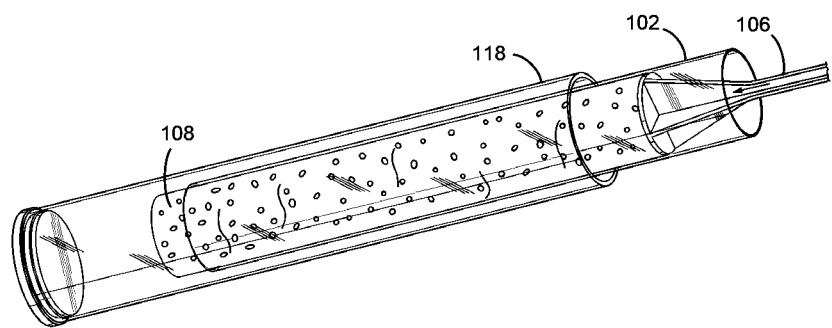
Figure 12:
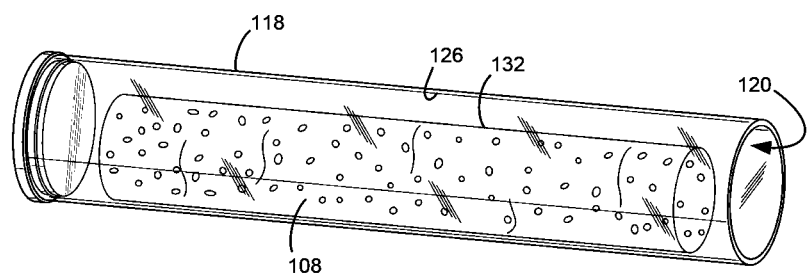

Referring to FIGS. 5 and 9-13, at step 520 of the process 500, the shaped dough article 108 is transferred from the molding tube 102 into the storage tube 118, which is sized for storing the shaped dough article 108 with most of the radially outer surface 132 of the shaped dough article 108 spaced apart from the radially inner surface 126 of the storage tube 118 (see e.g. FIG. 12). Referring to FIGS. 9-11, in the example illustrated, step 520 includes unsealing the molding tube first end 162, and pushing the shaped dough article 108 out from the molding tube 102 with the plunger 106. In some examples, an open end of the molding tube 102 (e.g. the unsealed molding tube first end 162 or the molding tube second end 164) is inserted into the storage tube 118, and the shaped dough article 108 is pushed out from the molding tube 102 directly into the storage tube 118 through the open end. Referring to FIGS. 12 and 13, after the shaped dough article 108 is transferred into the storage tube 118, the storage tube 118 may be sealed generally air tight (e.g. using the storage tube closures 172). The process 500 can then be repeated for another storage tube 118.

In some examples, the kit 100 includes instructions for using the kit 100 according to one or more steps disclosed herein and/or with respect to the process 500.

Figure 14:
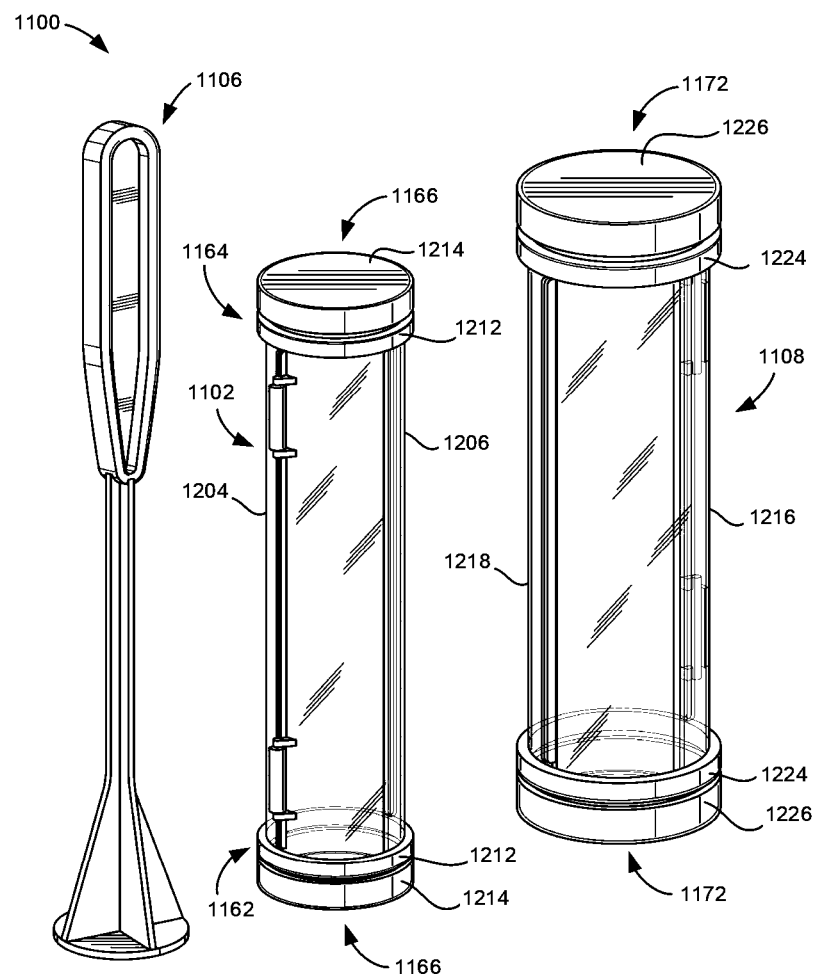
FIG. 14 is a perspective view of another example foodstuff molding and storage kit, shown assembled and with tubes of the kit in a closed configuration.

Referring to FIG. 14, another example kit 1100 for molding and storing foodstuff such as dough is illustrated. The kit 1100 has similarities to the kit 100, and like features are identified using like reference characters, incremented by 1000.

Figure 15:
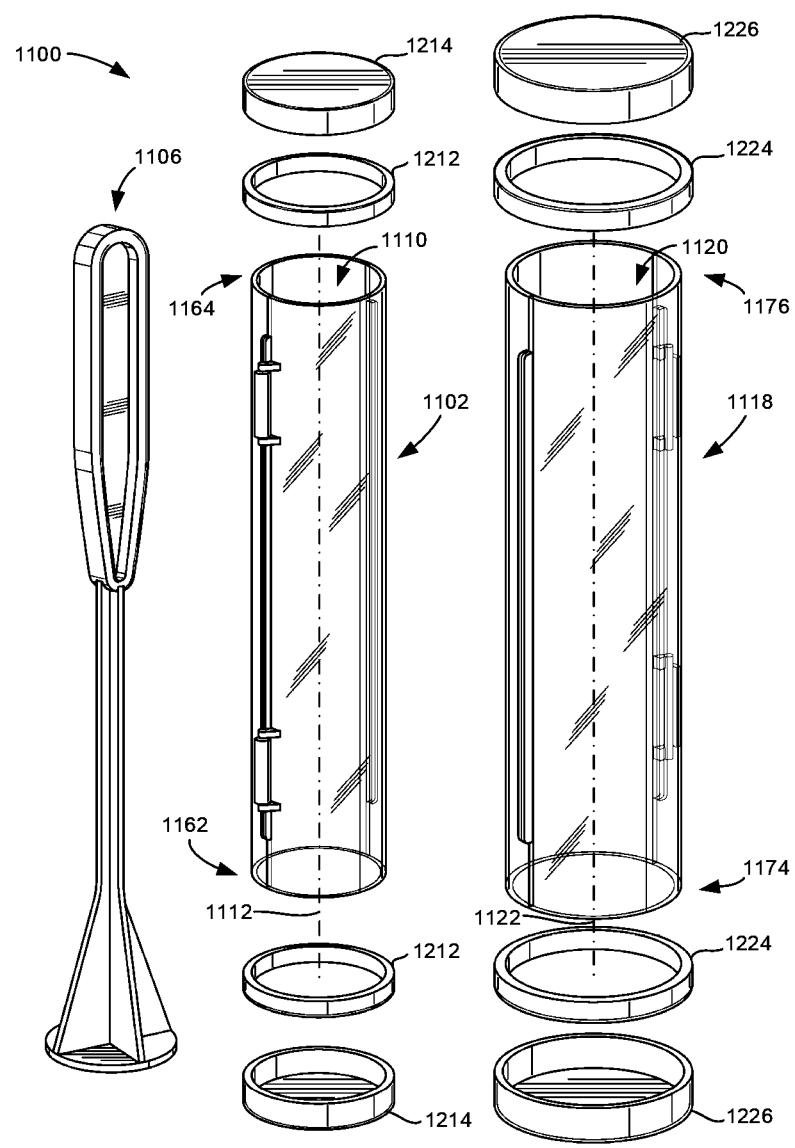
FIG. 15 is an exploded view of the kit of FIG. 14.
Figure 17:
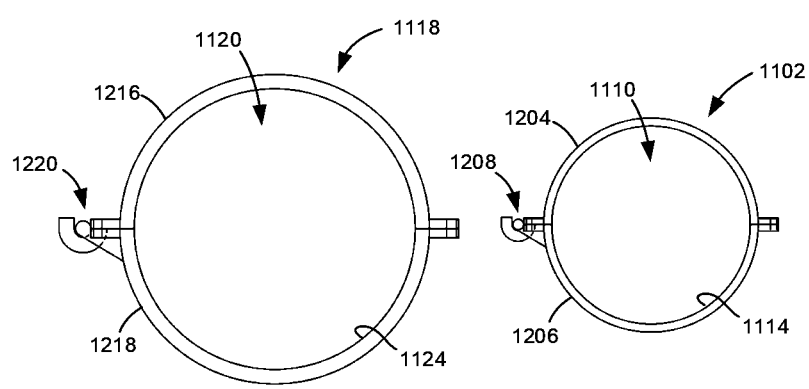
FIG. 17 is a top view of the tubes of the kit of FIG. 14, showing the tubes in the closed configuration.

Referring to FIG. 15, in the example illustrated, the kit 1100 includes a molding tube 1102 defining a molding bore 1110 having a molding cross-sectional profile 1114 (FIG. 17), at least one storage tube 1118 defining a storage bore 1120 having a storage cross-sectional profile 1124 (FIG. 17), and optionally, a plunger 1106. Referring to FIG. 17, the molding cross-sectional profile 1114 is sized and shaped to be nestable within a perimeter of the storage cross-sectional profile 1124 to facilitate storage of the shaped dough article 108 in the storage bore 1120 with reduced surface area contact relative to the molding bore 1110. The kit 1100 can also be used according to the process 500, and can include instructions for using the kit 1100 according to one or more steps disclosed herein, including those described above with respect to the process 500.

Figure 16:
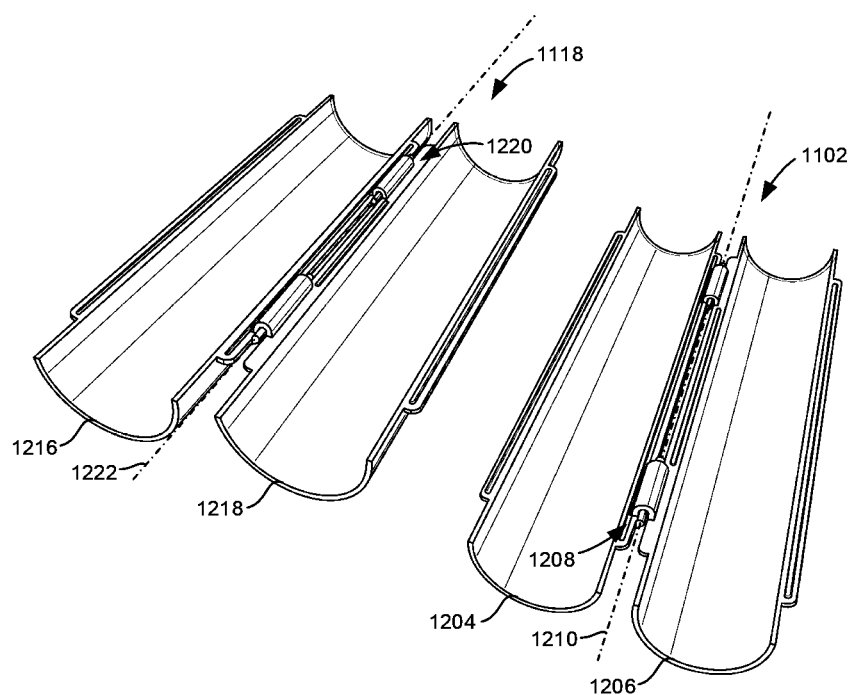
FIG. 16 is a perspective view of the tubes of the kit of FIG. 14, showing the tubes in an open configuration.

Referring to FIG. 16, in the example illustrated, the molding tube 1102 is split longitudinally into a molding tube first portion 1204 and a molding tube second portion 1206. In the example illustrated, the molding tube first and second portions 1204, 1206 are movable relative to each other between a closed position (FIG. 15) and an open position (FIG. 16). Referring to FIG. 15, in the example illustrated, in the closed position, the molding tube first and second portions 1204, 1206 cooperate to define the molding bore 1110. Referring to FIG. 16, in the example illustrated, in the open position, the molding tube first and second portions 1204, 1206 are at least partially separated to facilitate insertion and removal of dough 104 from the molding tube 1102. In some examples, the dough 104 may be packed into the molding tube first and/or second portions 1204, 1206 when in the open position to facilitate formation of the shaped dough article 108. In the example illustrated, the molding tube first and second portions 1204, 1206 are pivotally connected via a hinge assembly 1208 for pivoting about a pivot axis 1210 between the open and closed positions. In the example illustrated, the pivot axis 1210 extends parallel with the molding bore axis 1112 (FIG. 15).

Referring to FIG. 14, the kit 1100 optionally includes at least one removable molding tube collar 1212 sized for close fit over the molding tube 1102 when the molding tube portions 1204, 1206 are in the closed position, for inhibiting separation of the molding tube portions 1204, 1206 (e.g. during tamping). In the example illustrated, the kit 1100 includes two molding tube collars 1212, one positionable over the molding tube 1102 adjacent the molding tube first end 1162 for inhibiting separation of the first and second portions 1204, 1206 adjacent the molding tube first end 1162, and one positionable over the molding tube 1102 adjacent the molding tube second end 1164 for inhibiting separation of the first and second portions 1204, 1206 adjacent the molding tube second end 1164.

In the example illustrated, the kit 1100 further includes at least one molding tube closure 1166 for sealing at least one end of the molding tube 1102. In the example illustrated, the kit 1100 includes two molding tube closures 1166, one for sealing the molding tube first end 1162 and one for sealing the molding tube second end 1164. In the example illustrated, each molding tube closure 1166, comprises an end cap 1214 for positioning over the molding tube 1102 at a respective end. The end caps 1214 can cooperate with the optional collars 1212 to help inhibit separation of the molding tube first and second portions 1204, 1206 when closed. In some examples, the kit 1100 may be provided with a single end cap 1214 (for each molding tube) for sealing one end of the molding tube and inhibiting separation of the molding tube portions 1204, 1206 at the one end, and a single collar 1212 (for each molding tube) to help inhibit separation of the molding tube first and second portions 1204, 1206 at the other, open end of the molding tube 1102 through which the plunger 1106 may be inserted for tamping dough 104.

Referring to FIG. 16, in the example illustrated, the storage tube 1118 is split longitudinally into a storage tube first portion 1216 and a storage tube second portion 1218. In the example illustrated, the storage tube first and second portions 1216, 1218 are movable relative to each other between a closed position (FIG. 15) and an open position (FIG. 16). Referring to FIG. 15, in the example illustrated, in the closed position, the storage tube first and second portions 1216, 1218 cooperate to define the storage bore 1120. Referring to FIG. 16, in the example illustrated, in the open position the storage tube first and second portions 1216, 1218 are at least partially separated to facilitate insertion of the shaped dough article 108 into and removal of the shaped dough article 108 from the storage tube 1118. In the example illustrated, the storage tube first and second portions 1216, 1218 are pivotally connected via a hinge assembly 1220 for pivoting about a pivot axis 1222 between the open and closed positions. In the example illustrated, the pivot axis 1222 extends parallel with the storage bore 1120 (FIG. 15).

Referring to FIG. 15, in the example illustrated, the kit 1100 optionally includes at least one removable storage tube collar 1224 sized for close fit over the storage tube 1118 when the storage tube portions 1216, 1218 are in the closed position, for inhibiting separation of the storage tube portions 1216, 1218 (and to, for example, help keep the storage tube 1118 sealed). In the example illustrated, the kit 1100 includes two storage tube collars 1224 (for each storage tube), one positionable over the storage tube 1118 adjacent the storage tube first end 1174, and one positionable over the storage tube 1118 adjacent the storage tube second end 1176.

Referring to FIGS. 14 and 15, in the example illustrated, the kit further includes a pair of storage tube closures 1172

(for each storage tube 1118 provided in the kit 1100) for sealing opposed ends 1174, 1176 of the storage tube 1118. In the example illustrated, each storage tube closure 1172 comprises an end cap 1226 positionable over the storage tube 1118 at a respective end 1174, 1176, and which can help inhibit separation of the storage tube portions 1216, 1218. In the example illustrated, the storage tube collars 1224 are positionable intermediate the end caps 1226.

Figure 18:
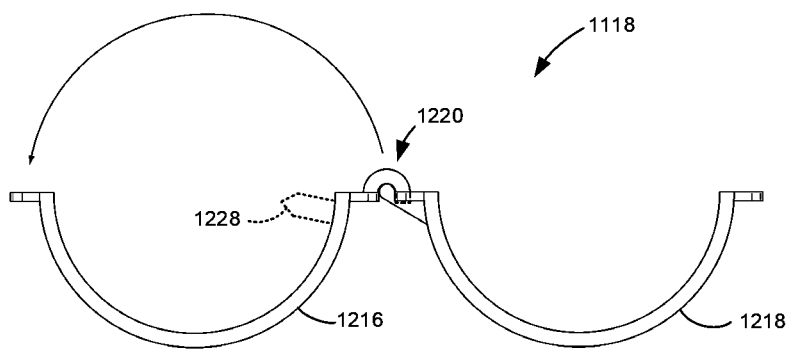
FIG. 18 is a top view of a storage tube of the kit of FIG. 14, showing the tube in the open configuration.

In some examples, the storage tube 1118 of the kit 1100 can include a plurality of cutting indicators. The cutting indicators can be spaced generally equally apart at predetermined intervals along the storage bore axis 1122, with the intervals corresponding to a predetermined thickness at which to cut the shaped dough article 108 (e.g. into individual portions for baking). Referring to FIG. 18, in some examples, each indicator comprises a projection 1228 (shown schematically in dashed lines) that extends radially inwardly from the inner surface of the storage tube 1118 for forming corresponding indentations in the shaped dough article 108 when stored in the storage bore 1120.

In other examples, the indicators can comprise visual markings (in lieu of or in addition to the projections 1228) on the storage tube 1118. In such examples, the visual markings can be used for positioning next to the shaped dough article 108 to help with cutting the shaped dough article 108 into portions having a desired thickness. In some examples, the storage tube 118 of the kit 100 can also include such visual markings.

In some examples, a kit according to the present disclosure can include one or more components from the kit 100, and one or more components from the kit 1100. For example, the kit can include the molding tube 1102, collar(s) 1212, and closure(s) 1224 and one or more sets of the storage tube 118 and closures 172 in a common package. In another example, the kit can include the molding tube 102 and closure 166, and one or more sets of the storage tube 1118, collars 1224, and closures 1172 in a common package.

Figure 19:
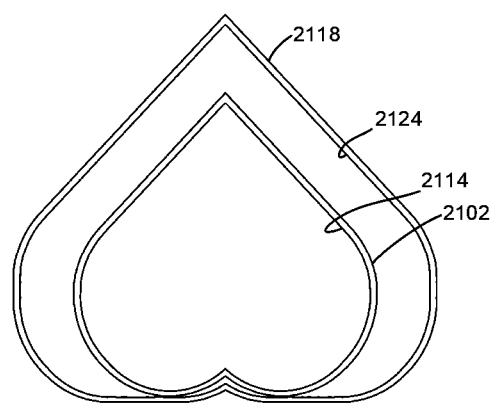
FIG. 19 is a bottom view of another example molding tube and storage tube, showing the molding tube nested in the storage tube.

Referring to FIG. 19, another example molding tube 2102 and storage tube 2118 for a dough molding and storage kit (e.g. similar to the kit 100) are shown. The molding tube 2102 and storage tube 2118 have similarities to the molding tube 102 and storage tube 118, respectively, and like features are identified using like reference characters, incremented by 2000. In the example illustrated, the molding tube 2102 has a molding tube cross-sectional profile 2114 that is generally heart shaped for forming a food article having a heart-shaped cross section. Kits including the molding tube 2102 can further include a plunger having a heart-shaped piston sized and shaped for close sliding fit within the molding tube 2102, and in some examples, at least one heart-shaped molding tube closure for sealing at least one end of the molding tube 2102. In the example illustrated, the storage tube 2118 has a storage tube cross-sectional profile 2124 that is generally heart shaped and sized and shaped for storing the heart-shaped food article therein with reduced surface area contact relative to the molding tube. Kits including the storage tube 2118 can further include heart-shaped storage tube closures for sealing the storage tube 2118 when the shaped food article is received therein.

Figure 20:
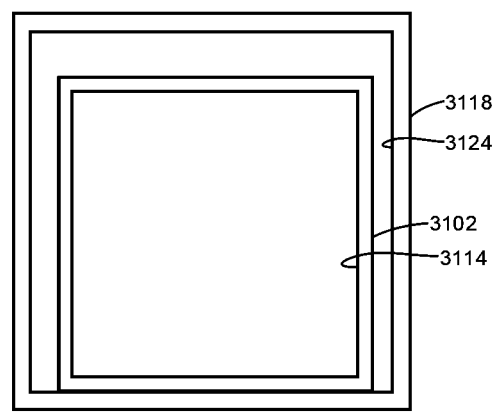
FIG. 20 is a bottom view of another example molding tube and storage tube, showing the molding tube nested in the storage tube.

Referring to FIG. 20, another example molding tube 3102 and storage tube 3118 for a dough molding and storage kit (e.g. similar to the kit 100) are shown. The molding tube 3102 and storage tube 3118 have similarities to the molding tube 102 and storage tube 118, respectively, and like features are identified using like reference characters, incremented by 3000. In the example illustrated, the molding tube 3102 has a molding tube cross-sectional profile 3114 that is generally square shaped for forming a food article having a square-shaped cross section. In the example illustrated, the storage tube 3118 has a storage tube cross-sectional profile 3124 that is generally square shaped and sized and shaped for storing the square-shaped food article therein with reduced surface area contact relative to the molding tube.

In some examples, a kit according to the present disclosure (e.g. a kit similar to the kit 100 or kit 1100) may include a storage tube having a cross-sectional size and/or shape different from that of the molding tube, but which can still accommodate storage of the shaped food article without any substantial deformation of the food article and with reduced surface area contact relative to when the food article is formed in the molding tube. For example, an example kit can include a molding tube having a heart-shaped cross-section for forming a heart-shaped food article, and a storage tube having a circular, square, or oval cross-section sized for storage of the heart-shaped food article.

Figure 21:
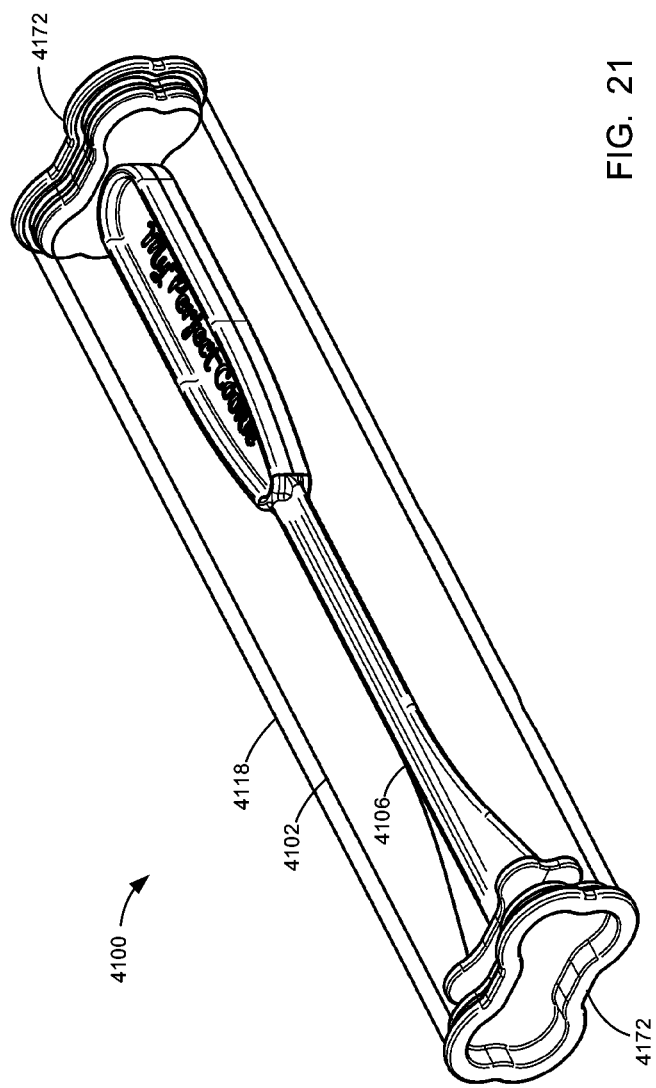
FIG. 21 is a perspective view of another example food molding and storage kit.

Referring to FIG. 21, another example kit 4100 for molding and storing malleable foodstuff is illustrated. Referring to FIG. 22, in the example illustrated, the kit 4100 includes a molding tube 4102 for shaping foodstuff received therein. The kit 4100 further includes a plunger 4106 slidable within the molding tube 4102 for tamping the foodstuff in the molding tube 4102 to form a shaped food article corresponding in shape to an interior 4110 of the molding tube 4102. The kit 4100 further includes a storage tube 4118 sized and shaped for storing the shaped food article in an interior 4120 of the storage tube 4118 with reduced surface area contact relative to the interior 4110 of the molding tube 4102.

In the example illustrated, the interior 4110 of the molding tube 4102 is defined by a mold cross-sectional shape and mold cross-sectional dimensions, and the interior 4120 of the storage tube 4118 is defined by a storage cross-sectional shape and storage cross-sectional dimensions. In the example illustrated, the storage cross-sectional shape corresponds to the mold cross-sectional shape. In the example illustrated, each of the storage cross-sectional shape and the mold cross-sectional shape comprises a dog bone shape, and the foodstuff can comprise, for example, a pet food mix (e.g. a dog treat mix). In the example illustrated, the storage cross-sectional dimensions are greater than corresponding mold cross-sectional dimensions to facilitate storage of the shaped food article in the interior 4120 of the storage tube 4118 with reduced surface area contact relative to the interior 4110 of the molding tube 4102.

In the example illustrated, the plunger 4106 has a piston 4150 sized and shaped for close sliding fit within the interior 4110 of the molding tube 4102. In the example illustrated, the piston 4150 has a piston shape corresponding the mold cross-sectional shape. In the example illustrated, the piston shape comprises a dog bone shape.

In the example illustrated, the kit 4100 further includes a molding tube closure 4166 (e.g. an end cap or plug) sized and shaped for sealing one end of the molding tube interior 4110, and a pair of storage tube closures 4172 (e.g. end caps or plugs) sized and shaped for sealing opposing ends of the storage tube interior 4120.

The invention claimed is:
1. A kit for molding and storing malleable foodstuff, comprising:
   a) a molding tube defining a molding interior extending along a molding tube axis, the molding interior having a molding cross-sectional profile, the molding cross-sectional profile generally constant along the molding tube axis;

b) a plunger slidable within the molding interior along the molding tube axis for tamping the malleable foodstuff received in the molding interior to form a shaped food article corresponding in shape to the molding cross-sectional profile; and c) at least one storage tube defining a storage interior extending along a storage tube axis, the storage interior having a storage cross-sectional profile, the storage cross-sectional profile generally constant along the storage tube axis, wherein the molding cross-sectional profile is sized and shaped to be nestable within a perimeter of the storage cross-sectional profile, to facilitate storage of the shaped food article in the storage interior with reduced surface area contact relative to the molding interior; wherein the molding cross-sectional profile is defined by a molding tube inner diameter and the storage cross-sectional profile is defined by a storage tube inner diameter, the storage tube inner diameter greater than the molding tube inner diameter, and wherein the molding tube is elongate and has a molding tube length extending along the molding tube axis from a molding tube first end of the molding tube to a molding tube second end of the molding tube longitudinally opposite the molding tube first end, and the shaped food article formable in the molding interior comprises an elongate food article, and wherein the at least one storage tube is elongate and has a storage tube length extending along the storage tube axis from a storage tube first end of the at least one storage tube to a storage tube second end of the at least one storage tube longitudinally opposite the storage tube first end, the storage tube length greater than the storage tube inner diameter and greater than the molding tube length to facilitate storage of the elongate food article in the storage tube interior.

2. The kit of claim 1, wherein the molding tube is insertable into the at least one storage tube.

3. The kit of claim 1, wherein the storage tube inner diameter is at least ¼ inch greater than the molding tube inner diameter.

4. The kit of claim 1, wherein the molding tube has a molding tube outer diameter, and the storage tube inner diameter is greater than the molding tube outer diameter.

5. The kit of claim 1, wherein the molding interior is open to the molding tube first and second ends, and wherein the kit further includes a molding tube closure for sealing the molding tube first end to facilitate tamping of the malleable foodstuff from the molding tube second end using the plunger, and wherein the kit further includes one or more storage tube closures for sealing the at least one storage tube when the shaped food article is received therein.

6. The kit of claim 5, wherein the molding tube closure is removable for unsealing the molding tube first end to facilitate pushing the shaped food article out from the molding interior using the plunger.

7. The kit of claim 1, wherein the plunger is hand-held and detached from the molding tube, and wherein the plunger extends along a plunger axis between a front end and a rear end, and includes a piston at the front end for pressing against the malleable foodstuff and a handle at the rear end for gripping by a user, the piston sized and shaped for close sliding fit within the molding interior.

8. The kit of claim 1, wherein the molding tube is split longitudinally into a molding tube first portion and a molding tube second portion, the molding tube first and second portions movable relative to each other between a closed position in which the molding tube first and second portions cooperate to define the molding interior, and an open position in which the molding tube first and second portions are at least partially separated to facilitate insertion and removal of the malleable foodstuff from the molding tube.

9. The kit of claim 1, wherein the molding cross-sectional profile is one of: circle shaped, square shaped, heart shaped, oval shaped, and dog bone shaped, and the storage cross-sectional profile is one of: circle shaped, square shaped, heart shaped, oval shaped, and dog bone shaped.

10. The kit of claim 1, wherein the at least one storage tube extends wherein the storage tube first end is open for accessing the storage interior from the storage tube first end and the storage tube second end is open for accessing the storage interior from the storage tube second end.

11. A kit for molding and storing malleable foodstuff, comprising:

a) a molding tube having a molding tube interior defined by a mold cross-sectional shape and mold cross-sectional dimensions;

b) a hand-held plunger for tamping the malleable foodstuff in the molding tube interior to form a shaped food article having the mold cross-sectional shape and dimensions, the hand-held plunger having a piston sized and shaped for close sliding fit within the molding tube interior; and c) at least one storage tube having a storage tube interior defined by a storage cross-sectional shape and storage cross-sectional dimensions, the storage cross-sectional shape corresponding to the mold cross-sectional shape, and the storage cross-sectional dimensions greater than corresponding mold cross-sectional dimensions to facilitate storage of the shaped food article in the storage tube interior with reduced surface area contact relative to the molding tube interior, wherein the at least one storage tube is elongate and has a length extending along a storage tube axis from a first end of the at least one storage tube to a second end of the at least one storage tube longitudinally opposite the first end, and wherein the storage cross-sectional dimensions comprise a widest dimension transverse to the storage tube axis, and the length of the at least one storage tube is greater than the widest dimension of the at least one storage tube.

12. The kit of claim 11, wherein the kit further includes a molding tube closure for sealing one end of the molding tube interior to facilitate tamping of the malleable foodstuff from an opposite end of the molding tube interior using the hand-held plunger.

13. The kit of claim 11, wherein the kit further includes one or more shelf stable and prepackaged ingredients for preparing the malleable foodstuff.

14. The kit of claim 11, wherein the kit further includes instructions for using the kit, the instructions indicating to a user to: (i) mold the malleable foodstuff in the molding tube using the hand-held plunger to form the shaped food article; (ii) transfer the shaped food article from the molding tube into the at least one storage tube by pushing the shaped food article out from the molding tube using the hand-held plunger and into the at least one storage tube; and (iii) after the shaped food article is in the at least one storage tube, seal the at least one storage tube.

15. The kit of claim 11, wherein the first end is open for accessing the storage tube interior from the first end, and the second end is open for accessing the storage tube interior from the second end.

16. The kit of claim 15, further comprising a removable first closure for sealing the first end of the at least one storage tube, and a removable second closure for sealing the second end of the at least one storage tube.

\* \* \* \* \*

UNITED STATES PATENT AND TRADEMARK OFFICE
CERTIFICATE OF CORRECTION

PATENT NO. : 11,793,228 B2
APPLICATION NO. : 17/249327
DATED : October 24, 2023
INVENTOR(S) : Grace Kwok It is certified that error appears in the above-identified patent and that said Letters Patent is hereby corrected as shown below:

In the Claims

Claim 10, Column 16, Lines 10-11:
"The kit of claim 1, wherein the at least one storage tube extends wherein the storage tube first end is open for"
Should read:
-- The kit of claim 1, wherein the storage tube first end is open for --

Signed and Sealed this
Second Day of January, 2024

Katherine Kelly Vidal
*Director of the United States Patent and Trademark Office*